United States Patent [19]

Kramer

[11] 4,127,560

[45] Nov. 28, 1978

[54] MELT POLYMERIZATION PROCESS FOR PREPARING A MELT PROCESSABLE RESORCINOL PHTHALATE POLYESTER UTILIZING A METAL ACETATE CATALYST

[75] Inventor: Charles E. Kramer, Florham Park, N.J.

[73] Assignee: Celanese Corporation, New York, N.Y.

[21] Appl. No.: 822,579

[22] Filed: Aug. 8, 1977

[51] Int. Cl.$^2$ .................................................. C08G 63/18
[52] U.S. Cl. .................................. 528/273; 528/275; 528/305
[58] Field of Search ........................................ 260/47 C

[56] References Cited

U.S. PATENT DOCUMENTS

| | | | |
|---|---|---|---|
| 2,035,578 | 3/1936 | Wagner | 260/2 |
| 2,595,343 | 5/1952 | Drewitt et al. | 260/47 |
| 3,160,602 | 12/1964 | Kantor et al. | 260/47 |
| 4,011,199 | 3/1977 | McFarlane | 260/47 C |

*Primary Examiner*—Lester L. Lee
*Attorney, Agent, or Firm*—Kenneth A. Genoni

[57] ABSTRACT

A melt processable resorcinol phthalate polyester having a terephthalic acid content not greater than about 30 mole percent is prepared by a two-stage process utilizing an alkali or alkaline earth metal acetate catalyst. The first stage yields a non-volatile pre-polymer which is then melt polymerized to the resorcinol phthalate polyester. A process for preparing a melt processable resorcinol phthalate polyester from resorcinol by reacting it with an acetylating agent is also disclosed. The resulting polyester exhibits high char and low flammability in addition to being melt processable.

33 Claims, No Drawings

MELT POLYMERIZATION PROCESS FOR PREPARING A MELT PROCESSABLE RESORCINOL PHTHALATE POLYESTER UTILIZING A METAL ACETATE CATALYST

BACKGROUND OF THE INVENTION

The present invention relates to a melt polymerization process for preparing resorcinol phthalate polyesters, wherein an ester interchange reaction takes place and product prepared therefrom.

In the past, polyesters have been prepared by a variety of methods including ester interchange, direct esterification, interfacial polymerization and acidolysis (see U.S. Pat. No. 4,011,199).

The stability of the reactants and the melt viscosity of the polyester prepared therefrom often play a dominant role in selecting a commercially acceptable manufacturing process. For example, polyesters of aliphatic and cycloaliphatic diols have viscosities that make these polyesters particularly suitable for commercial preparation using an ester interchange process. Polyesters prepared using aromatic diols, however, typically have such high melt viscosities that ester interchange cannot be used.

One particular method of achieving an ester interchange reaction is by a melt polymerization technique. This procedure is advantageous because it permits utilization of the free acid as opposed to the more expensive acid chloride required by certain other techniques. Further advantages of this technique lie in the ability to dispense with solvent recovery and acid neutralization procedures necessitated by the acid chloride route.

The melt polymerization procedures of the prior art, however, yield a commercially unacceptable product when applied to the preparation of a resorcinol phthalate polyester.

This results, in part, from the fact that resorcinol by itself does not react with phthalic acids in a melt process to yield a usable resorcinol phthalate polyester.

It has been observed that resorcinol phthalate polyesters in general are known as illustrated by W. Eareckson, *Interfacial Poly Condensation X Poly Phenyl Esters*, 40 J. Pol. Sci. 399–406 (1959); U.S. Pat. Nos. 3,160,602; 2,595,343; and 2,035,578; and British Pat. No. 863,704. The discussion of resorcinol-phthalate polyesters in the prior art, however, has typically centered on methods of making polyesters in general. Consequently, the description of specific resorcinol phthalate polyesters and the properties associated therewith have been of limited scope.

Thus, only resorcinol phthalate polyesters having either 100% isophthalic acid, 100% terephthalic acid, or a 50:50 molar ratio of a mixture of isophthalic and terephthalic acid appear to have been recognized and described in the art.

It has heretofore been unknown that only certain proportional isomer ranges of isophthalic and terephthalic acid are capable of yielding a melt processable polymer. It has also been unknown that the effective utilization of a melt polymerization process to prepare a resorcinol phthalate polyester is also contingent upon the employment of certain specified proportional acid isomer ranges.

It has been further observed that wholly aromatic polyesters may be prepared by an ester interchange reaction as illustrated by U.S. Pat. Nos. 3,160,604; 3,036,992; and 2,595,343.

It has been still further observed that a wide variety of catalysts have been considered for use in preparing wholly aromatic polyesters in general by an ester interchange reaction as illustrated by U.S. Pat. Nos. 3,824,213; and 3,651,041; and U.S. patent applicaton Ser. No. 789,374, filed Apr. 20, 1977, by G. Calundann, H. Davis, R. Gorman, and R. Mininni, entitled "Improved Melt Processable Thermotropic Wholly Aromatic Polyester Which Is Particularly suited for Fiber Formation."

For example, in the Calundann et al application, representative catalysts disclosed therein include dialkyl tin oxide, (e.g., dibutyl tin oxide), diaryl tin oxide, titanium dioxide, alkoxy titanium silicates, titanium alkoxides, the gaseous acid catalysts such as Lewis acids, hydrogen halides (e.g., HCl), alkali and alkaline earth metal salts of carboxylic acids (e.g., sodium acetate), etc.

It has not heretofore been known that alkali and alkaline earth metal acetate catalysts are especially suited for the preparation of a resorcinol phthalate polyester by the melt polymerization process described herein and that most of the conventional ester interchange catalysts such as the representative catalysts described above are unacceptable for this purpose.

It is, therefore, an object of the present invention to provide a process for the preparation of a melt processable resorcinol phthalate polyester by the melt polymerization of resorcinol diacetate and a phthalic acid or mixtures thereof.

It is another object of the present invention to provide a process for preparing a melt processable resorcinol phthalate polyester by the melt polymerization technique from resorcinol which is subsequently converted to a diacetate and a phthalic acid or mixtures thereof.

It is a still further object of the present invention to provide a melt processable resorcinol phthalate polyester.

These and other objects as well as the scope, nature and utilization of the invention will be apparent to those skilled in the art from the following description and appended claims.

SUMMARY OF THE INVENTION

In one aspect of the present invention, there is provided a process for preparing a melt processable resorcinol phthalate polyester which comprises (a) reacting resorcinol diacetate with a phthalic acid selected from the group consisting of isophthalic acid and a mixture of isophthalic and terephthalic acid wherein the terephthalic acid is present therein in an amount not greater than about 30 mole percent of the mixture, which reaction is conducted in the presence of a metal acetate catalyst wherein said metal is selected from the group consisting of cations of alkali and alkaline earth metals and at a temperature of about 180° to about 240° C. for a period sufficient to form a non-volatile pre-polymer; and (b) polymerizing the non-volatile pre-polymer of step (a) at a temperature above the melting point of both the prepolymer and the resulting polymerized product in the presence of a metal acetate catalyst wherein said metal is selected from the group consisting of cations of alkali and alkaline earth metals and mixtures thereof to yield a polyester having an inherent viscosity of about 0.4 to about 1.5.

In another aspect of the present invention there is provided a process for preparing a melt processable resorcinol phthalate polyester which comprises (a) reacting resorcinol and an acetylating agent by heating said compounds to a temperature of about 100° to about 130° C. and in a manner sufficient to yield resorcinol diacetate; (b) purifying the resulting resorcinol diacetate to the extent sufficient to obtain 99.5% resorcinol diacetate; (c) reacting the resulting purified resorcinol diacetate with a phthalic acid selected from the group consisting of isophthalic acid and a mixture of isophthalic and terephthalic acid wherein the terephthalic acid is present therein in an amount not greater than about 30 mole percent of the mixture which reaction is conducted in the presence of a metal acetate catalyst wherein said metal is selected from the group consisting of cations of alkali and alkaline earth metals and mixtures thereof and at a temperature of about 180° to about 240° C. for a period sufficient to form a non-volatile pre-polymer; and (d) polymerizing a melt of the pre-polymer of step (c) at a temperature of about 240° to about 300° C. in the presence of a metal acetate catalyst wherein said metal is selected from the group consisting of cations of alkali and alkaline earth metals and mixtures thereof to yield a polyester having an inherent viscosity of about 0.4 to about 1.5.

In still another aspect of the present invention there is provided a melt processable resorcinol phthalate polyester which comprises the reaction product of resorcinol diacetate and a mixture of about 95 to about 80 mole percent isophthalic acid and correspondingly from about 5 to about 20 mole percent by weight terephthalic acid.

DESCRIPTION OF THE PREFERRED EMBODIMENTS

The resorcinol phthalate polyester of the present invention is prepared by reacting resorcinol diacetate with a phthalic acid in a two-stage polymerization process in the presence of a metal acetate catalyst. The first stage results in the formation of a pre-polymer while the second stage utilizes a melt polymerization technique to form the final resorcinol phthalate polyester.

The phthalic acid which is reacted with the resorcinol diacetate is selected from the group consisting of isophthalic acid and a mixture of isophthalic acid and terephthalic acid wherein the terephthalic acid is present in an amount not greater than about 30 mole percent of said mixture.

When terephthalic acid is present in an amount greater than about 30 mole percent the melting point of the resulting polyester is greater than the temperature at which significant degradation occurs and it is not feasible to prepare the polymer by a melt polymerization procedure. Moreover, a resorcinol phthalate polyester having a terephthalate content greater than about 30% is not melt processable. A melt processable resorcinol phthalate polyester is one which can be extruded (e.g., injection molded) at temperatures of from about 250° to 320° C. at a pressure of about 5,000 to about 25,000 psi.

Properties of the resorcinol phthalate polymer such as tensile strength, flexural strength, modulus, glass transition temperature ($T_g$) and heat distortion temperature may be varied by altering the isophthalic-terephthalic acid isomer ratio within the described ranges.

In general, the presence in limited amounts of the terephthalate moiety in the resulting polyester increases the strength and use temperature thereof while lowering the melting point and thereby improving melt processability.

Thus, although isophthalic and terephthalic acid may be present in the reaction mixture in any amounts within the defined limits it is preferred that the isophthalic acid be present in amounts which can vary from about 100 to about 80 mole percent, preferably from about 95 to about 80 mole percent, and most preferably from about 90 to about 85 mole percent (e.g., 90 mole percent) by weight of the total mixture, and correspondingly the terephthalic acid can be present in amounts which can vary from about 0 to about 20 mole percent, preferably from about 5 to about 20 mole percent, and most preferably from about 10 to about 15 mole percent (e.g., 10 mole percent) by weight of the total mixture.

The resorcinol diacetate utilized as a reactant in the melt polymerization process should not contain impurities which would adversely affect the resulting polymer product.

The melt polymerization reaction is generally conducted with the reactants present in amounts sufficient to fully transesterify the resorcinol diacetate. Generally, substantially stoichiometric amounts of each reactant are employed; typical molar amounts of from 1:.9:.1 to about 1:.8:.2 of the ester of resorcinol diacetate, isophthalic acid, and terephthalic acid, respectively, are utilized.

The melt polymerization reaction of the present invention has been found to be dependent on the utilization of certain specified catalysts and temperatures.

Conventional polytransesterification catalysts such as $Sb_2O_3$, tetra alkyl titanates (e.g., tetrabutyl titanate), dialkyl tin oxides (e.g., dibutyl tin oxide), diaryl tin oxide, titanium dioxide, alkoxy titanium silicates, titanium alkoxides, and the gaseous acid catalysts such as Lewis acids, hydrogen halides (e.g., HCl) are unsuitable for the purposes of the presently claimed invention and yield only highly colored low molecular weight material. It is believed that the unacceptably poor results obtained by these catalysts are due to the tendency of the polymer and/or the resorcinol diacetate monomer to undergo Fries rearrangements or FriedelCrafts type substitution on the resorcinol ring.

Condensation without a catalyst is very slow and leads to incomplete reactions.

In order to achieve the advantages of the presently claimed process it is necessary to conduct both the pre-polymer forming reaction and the melt polymerization reaction in the presence of a metal acetate catalyst wherein said metal is selected from the group consisting of cations of alkali and alkaline earth metals and mixtures thereof.

The relative reactivity of the catalysts varies depending on whether it is utilized in the first stage of pre-polymer former or the second stage of polymerization, i.e., melt polymerization.

Thus, in the first stage the preferred metals utilized to provide the metal acetate catalysts include in order of descending reactivity, sodium, potassium, lithium and calcium while the preferred metal of the second stage includes in order of descending reactivity potassium, calcium, lithium and sodium.

The most preferred catalyst for both stages is a mixture of sodium acetate and potassium acetate wherein the components of said mixture are present at a molar ratio of about 1:1.

Although any effective amount of catalyst may be utilized in either the first (i.e., pre-polymer forming) stage or second (i.e., melt polymerization) stage, it is preferred that such amount constitute in the first stage from about 1.0 to about 0.1%, most preferably about 0.7% by weight based on the total monomer weight of resorcinol diacetate, and in the second stage from about 1.0 to about 0.1%, and most preferably about 0.5% by weight of the total weight of the non-volatile pre-polymer. Utilization of the above described metal acetate catalysts permits two step polymerization times of about 3 to about 12 hours, preferably from about 3 to about 8 hours, and most preferably from about 3 to about 4 hours may be obtained in accordance with the present invention. The short polymerization times obtainable by the use of the metal acetate catalyst minimizes the rearrangement of the polyester molecule chains and consequently a high molecular weight melt processable polymer is obtained.

As described above, the process of the present invention is accomplished in two stages.

The first stage is conducted at temperatures below the boiling point of the resorcinol diacetate to yield a non-volatile pre-polymer. It is not feasible to directly melt polymerize the above reactants since resorcinol diaetate exists as a liquid at room temperature and is volatilized at the temperature required for melt polymerization. To overcome this difficulty, the resorcinol diacetate monomer is reacted at low temperatures to an extent sufficient to condense at least one of the acetate groups present thereon with a carboxyl group of the phthalic acid to form a pre-polymer comprising dimers trimers and the like. The pre-polymer may be characterized as being non-volatile, in that it degrades under the influence of elevated temperatures before it vaporizes into the gaseous state. Thus, although any temperature below the boiling point of the resorcinol diacetate which is sufficient to achieve the desired reaction may be utilized, it is preferred that such temperature constitute from 180° to about 240° C., preferably from about 200° to about 240° C., and most preferably from about 220° to about 240° C.

To achieve the desired extent of the pre-polymer forming reaction it is possible to monitor the evolution of acetic acid. This can be accomplished by condensing the vapor as it is removed from the reaction vessel and measuring the weight or volume. The reaction is considered complete when about 90% by weight of the theoretical amount is collected.

Alternatively, the pre-polymer forming reaction can be conducted to provide a pre-polymer having an inherent viscosity (I. V.) measured in a 0.1% solution of pentafluorophenol of from about 0.05 to about 0.2 (e.g., 0.1).

Typical reaction times sufficient to obtain the non-volatile pre-polymer can vary from about 1 to about 4 hours, preferably from about 1 to about 3 hours, and most preferably from about 1 to about 2 hours.

The pressure at which the pre-polymer forming reaction can be conducted is typically atmospheric.

The pre-polymer forming reaction is conducted under an inert atmosphere such as nitrogen.

In certain instances it may be desirable to utilize a heat transfer medium in the preparation of the non-volatile pre-polymer. The heat transfer medium should be capable of substantially dissolving the reactants and resulting pre-polymer and refluxing under the temperatures employed to prepare the pre-polymer. It should also be incapable of undergoing reaction with the reactants. Thus, the heat transfer medium serves to conduct heat uniformly to the reactants while at the same time washes the sides of the reaction vessel thereby keeping the reactants in contact with each other. Suitable heat transfer mediums include inert solvents having a boiling point of not lower than about 250° C.

Representative heat transfer mediums include diphenyl ether, terphenyls and mixtures thereof such as those composed of meta and para isomers commercially available from Monsanto Chemical Company under the trademark Therminol (e.g., Therminol 88, 77 or 66) chlorinated diphenyls, benzophenone, and chlorinated diphenyl ether.

A preferred heat transfer medium is diphenyl ether.

The heat transfer medium (e.g., diphenyl ether) is typically present at an amount which can vary from about 10 to about 50% by weight of the combined weight of reactants and heat transfer medium.

If a heat transfer medium is utilized, it is generally removed from the reaction vessel prior to commencing the second stage of polymerization by any means known to those skilled in the art, such as by distillation. Alternatively, a heat transfer medium having a boiling point above the temperatures employed in the second stage polymerization reaction may remain present during polymerization although its presence does not contribute substantially to the melt polymerization procedure.

The non-volatile pre-polymer prepared in accordance with the procedure described above is then polymerized at a temperature above the melting point of both the pre-polymer and the resulting polymerized product and in the presence of the above-described metal catalyst to yield a resorcinol phthalate polyester.

Although any temperature above the melting point of both the pre-polymer and the resulting product and below the decomposition temperature of the same may be utilized, it is preferred that such temperature constitute from about 240° to about 300° C., preferably from about 260° to about 290° C., and most preferably from about 270° to about 280° C. Thus, the second stage polymerization is conducted with the reactants and products of reaction in the molten state and in the absence of a solvent medium.

The melt polymerization reaction is conducted at the above-described temperatures for a period of about 1 to about 8 hours, preferably from about 2 to about 6 hours, and most preferably from about 2 to about 4 hours and under a reduced pressure of about 0.4 to about 2 mm Hg, preferably from about 0.1 to about 1 mm Hg, and most preferably from about 0.1 to about 0.3 mm Hg.

It is also preferred to conduct the melt polymerization reaction under an inert atmosphere such as nitrogen or argon.

Generally, the melt polymerization reaction is conducted so as to obtain a resorcinol phthalate polyester having an inherent viscosity (I. V.) of at least 0.4, preferably from about 0.4 to about 1.5, and most preferably from about 0.5 to about 1.0 (e.g., 0.5).

The I. V. is determined by measurement of the relative viscosity of a 0.1% solution of the polymer at 25° C. in a suitable solvent, such as pentafluorophenol. The viscosity of the polymer solution is measured relative to that of the solvent alone and the inherent viscosity (I. V.) is determined from the following equation:

$$I.V. = \frac{\ln \frac{V_2}{V_1}}{C}$$

In the above formula, $V_2$ is the efflux time of the solution, $V_1$ is the efflux time of the solvent, and C is the concentration expressed in grams of polymer per 100 ml. of solution. As is known in the polymer art, inherent viscosity is monotonically related to the molecular weight of the polymer.

Another aspect of the present invention is directed to a process for preparing a melt processable resorcinol phthalate polyester from resorcinol and acetic anhydride or other suitable acetylating agent. It has been found that it is not feasible to react resorcinol and an acetylating agent under elevated temperature and utilize the resulting resorcinol diacetate product directly in the preparation of resorcinol phthalate polyester. This results from the fact that resorcinol diacetate synthesis is accompanied by the formation of several undesirable side products which if present during resorcinol phthalate polyester synthesis will yield a dark brown low molecular weight polymer which is not melt processable. The side products are believed to be induced by Fries rearrangements and/or acylation of the active resorcinol ring. The undesirable side products must, therefore, be removed from the synthesized resorcinol diacetate prior to commencing the synthesis of a resorcinol phthalate polyester from a resorcinol diacetate.

Accordingly, resorcinol is reacted with a suitable acetylating agent.

Suitable acetylating agents include acetic anhydride and acetyl halides such as acetyl bromide and preferably acetyl chloride.

The acetylating reaction is conducted at temperatures below the boiling point of the acetylating agent and can typically range from about 80° to about 140° C., preferably from about 100° to about 130° C. (e.g., 120° C.) and in a manner sufficient to yield resorcinol diacetate. Temperatures in excess of the boiling point of the acetylating agent (e.g., 138° C. for acetic anhydride) should not be utilized to avoid loss of the acetylating agent.

The reactants are present at substantially stoichiometric molar ratio of about 1:2 of resorcinol and acetylating agent, respectively, although an excess, i.e., up to 50 mole %, of the acetylating agent may be utilized to increase the reaction rate and then recycled. The resorcinol diacetate is then purified to eliminate the undesirable side products, such as, by vacuum distillation or low temperature recrystallization.

The purification procedure is conducted to the extent sufficient to obtain a purity of about $\geq 99.5\%$ and to eliminate any monoacetate, and products resulting from Fries rearrangement or ring acylation which produce a chain stopping action if present during the pre-polymer formation and particularly during the melt polymerization step.

The only impurity which presence is acceptable in trace amounts (i.e., less than 0.5%) is the dimerization product of resorcinol.

The purified resorcinol diacetate is then utilized in accordance with the processes described above.

Generally, the above-described process is conducted in a batch-type manner, however, any other suitable manner known to those skilled in the art may be employed if so desired.

The resorcinol phthalate polyesters of the type described herein have a high char, low flammability and good injection molding properties, i.e., they are easily melt processable.

In general, decreased flammability will lead to incomplete combustion which is typically accompanied by the production of large amounts of smoke. Resorcinol phthalate polyesters are exceptions to this rule.

The ability of this polymer to form a char upon combustion contributes to the unexpectedly low level of flammability by retaining the less oxidizable aromatic moieties in the bulk phase via cross linking and thereby removes them from combustible gaseous fuel. Moreover, the carbonaceous char also acts as a thermal (e.g., heat sink) and gas diffusion barrier thereby inducing a cooling effect at the polymer surface while simultaneously disrupting diffusion of oxygen to the polymer surface and small combustible molecules to the flame front.

The resorcinol phthalate polyester of the present invention can be readily melt processed to form a variety of shaped articles, e.g., molded three dimensional articles, fibers, or films. The polyester of the present invention is particularly suited for molding applications and may be molded via standard injection molding techniques commonly utilized when forming molded articles unlike the resorcinol phthalate having an acid isomer ratio outside the claimed ranges. Fibers or films may be melt extruded.

When it is intended that the resorcinol phthalate polyester be utilized in molding applications, one or more solid fillers or reinforcing agents optionally may be incorporated in the same via a melt admixture technique to form a filled and/or reinforced injection molding compound. Such fillers and/or reinforcing agents may be included in a total concentration of about 0 to 40% by weight of the resulting molding compound.

Representative fibers which may serve as reinforcing media include glass fibers, asbestos, graphitic carbon fibers, amorphous carbon fibers, synthetic polymeric fibers, aluminum fibers, aluminum silicate fibers, oxide of aluminum fibers, titanium fibers, magnesium fibers, rock wool fibers, steel fibers, tungsten fibers, cotton wool, and wood cellulose fibers, etc. If desired, the fibrous reinforcement may be preliminarily treated to improve its adhesion ability to the resorcinol phthalate polyester which ultimately serves as a continuous matrix phase. Representative filler materials include calcium silicate, silica, clays, talc, mica, polytetrafluoroethylene, graphite, alumina trihydrate, sodium aluminum carbonate, barium ferrite, etc. Colorants optionally may be included.

Molded shaped articles formed from the resorcinol phthalate polyester of the present invention generally exhibit a superior tensile strength, flex strength, and impact strength. Also, the appearance of the resulting molded articles generally is superior with the resulting molded articles being commonly clear and exhibiting a light yellow to amber color and an attractive smooth surface.

The invention is additionally illustrated in connection with the following Examples, which are to be considered as illustrative of the present invention. It should be understood, however, that the invention is not limited to the specific details of the Examples.

Unless otherwise indicated, all percentages or proportions of materials mentioned in the specification and appended claims are by weight.

EXAMPLE I 29.9 gm (0.18 mole) isophthalic acid, 3.3 gm. (0.02 mole) terephthalic acid, 39.4 gm. (0.20 mole), 1.5% excess resorcinol diacetate, 10 ml. diphenylether, 1 ml. acetic anhydride and 0.27 gm. (0.002 mole) sodium acetate trihydrate catalyst are weighed into a dry three neck 300 ml. flask. The acetic anhydride is used as a water scavenger and acetylating agent for any unreacted or partially acetylated resorcinol. The diphenyl ether solvent is not required for the reaction but is used for convenience to wash the sides of the vessel during the early stages of the condensation. The flask is fitted with a nitrogen inlet, Servodyne ™ mechanical stirrer with RPM and torque read outs, condenser, fifty ml. graduated receiver and vacuum adaptor. The flask is purged with dry, oxygen free nitrogen and brought to 240° C. over 0.5 hr. with stirring. The reaction is held at 240° C. for 3 hr. while a theoretical amount of acetic acid is collected. At this point, vacuum is applied to remove the diphenyl ether, and the reaction temperature is brought to 280° C. The mixture is held at 280° C. and ≦1.0 mm Hg. pressure for three hours and the increase in viscosity is monitored by observing stirrer torque. The reaction is then cooled under nitrogen, the flask broken and polymer ground to approximately 5 mesh.

EXAMPLES 2–4

The same general procedure outlined in Example 1 is repeated with the exception that identity of the catalyst and/or reaction temperatures are varied. The catalyst and reaction conditions are summarized in Table I.

EXAMPLE 5

A 6 lb. resorcinol phthalate sample is prepared in accordance with the procedure outlined in Example 1 utilizing a sodium acetate catalyst with the exception that a longer reaction time for the second stage is utilized (i.e., 10 hrs. under vacuum in melt). The resulting product is pelletized by a Warner-Pfleider ZSK twin screw extruder, dried and injection molded. Molding conditions and polymer physical properties are summarized at Table II.

TABLE II
MECHANICAL PROPERTIES OF POLY (RESORCINOL PHTHALATE

| | |
|---|---|
| I.V. | 0.49 |
| Tensile strength (psi) | 11,400 |
| Flex strength (psi) | 16,400 |
| Flex modulus (psi × 105) | 4.00 |
| Notched Izod (ft-lb/in) | 0.95 |

TABLE II-continued
MECHANICAL PROPERTIES OF POLY (RESORCINOL PHTHALATE

| | |
|---|---|
| Heat Distortion Temp. - (264 psi) | 119° C |
| Rockwell Hardness M-scale | 91 |
| Molding Conditions | |
| Cylinder Temp. | 560° F (293° C) |
| Mold Temp. | 175° F (79° C) |
| Cycle Time (Cycle Times/sec.) | Inj. - 10, Cooling - 20, Delay - 2 |
| Injection Press. (psi) | 15000 |
| Molding Temp. | 590° F (319° C) |

EXAMPLE 6

Preparation of Resorcinol Diacetate 110 gm (1.0 mole) of resorcinol and 255 gm (2.5 mole) of acetic anhydride are added to a reaction vessel fitted with a distillation head, condensor, thermometer, and receiving vessel and heated to a temperature of 100° C. for a period of about 1.0 hr. under an atmosphere of nitrogen. The temperature is then raised to 130° C. to distill acetic acid and finally to 140° C. to distill the excess acetic anhydride.

The resulting product is purified by vacuum distillation under a pressure of about 10 mm Hg. The yield of purified resorcinol diacetate is about 85 to 90% by weight.

The resulting purified resorcinol diacetate is reacted with isophthalic and terephthalic acid in accordance with the procedure outlined in Example 1. The resulting polymer possesses substantially the same physical and chemical properties of the polymer of Example 1.

COMPARATIVE EXAMPLES 1–4

To illustrate that many of the catalysts typically employed in an ester interchange reaction, utilized to prepare other wholly aromatic polyesters, are unsuitable for use in the present invention several different catalysts are utilized in place of the metal acetate catalysts of the present invention in accordance with the procedure outlined in Example 1. The catalysts and reaction conditions are summarized at Table III. The effect of the absence of a catalyst is also illustrated at Table III.

As may be seen from a review of Table III conventional ester interchange catalysts yield very slow reaction rates and inferior end products.

TABLE I
THERMAL SYNTHESIS OF POLY(RESORCINOL PHTHALATE)

| Example No. | Catalyst | 1st Stage Temp. | 1st Stage Time | 2nd Stage Temp. | 2nd Stage Time | Relative Rate[a] | I.V.[b] | Comments |
|---|---|---|---|---|---|---|---|---|
| 2 | Na OAc | 240° | 2 hr. | 280° | 2.5 hr. | 1st-fast 2nd fast | 0.83 | 1. amber, tough, flexible |
| 3 | KOAC | 240° | 2.5 hr. | 280° | 1 hr. | 1st-fast 2nd-very fast | 0.83 | 1. amber, tough, flexible |
| 4 | Mg(OAC)$_2$ | 240° | 3.5 hr. | 280° | 2 hr. | 1st-moderate 2nd-fast | 0.66 | 1. amber, tough, flexible |
| 5 | KOAC + Na OAC | 240° | 2 hr. | 280° | 1.5 hr. | 1st-fast 2nd-very fast | 0.69 | 1. amber, tough, flexible |

[a] 1st Stage - rate of HOAC distillation 2nd Stage - rate of torque increase
[b] 0.1% in pentafluorophenol

TABLE III
THERMAL SYNTHESIS OF POLY(RESORCINOL PHTHALATE)

| Comparative Example No. | Catalyst | 1st Stage Temp. °C | 1st Stage Time | Heating Profile 2nd Stage Temp. | 2nd Stage Time | Relative Rate[a] | I.V.[b] | Comments |
|---|---|---|---|---|---|---|---|---|
| 1 | No Cat. | 240° | 3 hr. | — | — | 1st very slow 1st-very slow | — | only 20% reaction |

TABLE III-continued
THERMAL SYNTHESIS OF POLY(RESORCINOL PHTHALATE)

| Comparative Example No. | Catalyst | 1st Stage Temp. °C | 1st Stage Time | Heating Profile 2nd Stage Temp. | 2nd Stage Time | Relative Rate[a] | I.V.[b] | Comments |
|---|---|---|---|---|---|---|---|---|
| 2 | $(C_4H_9)_2$ SnO | 240° | 6.5 hr. | 275° | 4 hr. | 2nd-no apparent reaction 1st-slow | — | Dark brown - brittle |
| 3 | Na OAc + $Sb_2O_3$ | 240° | 5.5 hr. | 280° | 4.5 hr. | 2nd-slow 1st-moderate | — | amber, glassy, brittle |
| 4 | Ni $(OAc)_2$ + Ni $(ClO_4)_2$ | 240° | 4 hr. | 280° | 3 hr. | 2nd-no apparent reaction | 0.16 | amber, glassy, brittle |

[a] -1st Stage - rate of HOAC distillation 2nd Stage - rate of torque increase
[b] - 0.1% in pentafluorophenol

COMPARATIVE EXAMPLE 5

The following comparative example is presented to illustrate the effect on melt polymerizability of utilizing an isophthalic:terephthalic isomer ratio wherein the terephthalic acid is in excess of 30 mole percent of the total isomer mixture.

Thus, a resorcinol phthalate polyester is prepared in accordance with the procedure outlined in Example 1 except that 19.9 gm (0.12 mole) isophthalic acid, and 13.3 gm (0.08 mole) terephthalic acid are reacted with 39.4 gm of resorcinol diacetate. This corresponds to an iso:tere molar acid ratio of 60:40.

Upon removal of the diphenyl ether as described in Example 1, the pre-polymer solidifies at 240° C. and although it melts at temperatures of about 300° C. or higher the temperature must be increased to about or above the degradation temperature of the polymer to obtain a melt viscosity suitable to achieve successful melt polymerization.

COMPARATIVE EXAMPLE 6

The following comparative example is presented to illustrate the effect of utilizing an isophthalic:terephthalic acid isomer ratio, wherein the terephthalic acid component is in excess of 30 mole percent, i.e., 60:40 isophthalic:terephthalic, on the melt processability of a resorcinol phthalate polyester.

Since the preparation of a resorcinol phthalate polyester having an acid isomer ratio of about 60:40 isophthalic:terephthalic, respectively, by the melt polymerization described herein is not feasible, it is necessary to prepare such polymer by the solution polymerization technique.

Thus, 27.5 gm (0.25 mole) of resorcinol are added to a reaction vessel containing 400 ml of methylene chloride. 115 gm of triethylamine in 300 ml of methylene chloride is then added to the reaction vessel. A second solution containing 61.6 gm (0.25 mole) of a mixture of isophthaloyl chloride and terephthaloyl chloride wherein the components of said mixture are present therein at a molar ratio of about 0.6:0.4, respectively, is dissolved in 150 ml of methylene chloride and added to the reaction vessel containing the resorcinol at about room temperature. The resulting resorcinol phthalate polyester is then washed several times in HCl and water and attempted to be injection molded at the conditions utilized in Example 1. It is found that the polymer does not injection mold at the conditions employed.

COMPARATIVE EXAMPLE 7

The purpose of this example is to illustrate the effect of failing to purify the resorcinol diacetate prior to reacting it with phthalic acid or mixture thereof.

Thus, Example 6 is repeated with the exception that the resulting resorcinol diacetate is not purified prior to forming the resorcinol phthalate polyester.

The resulting impure resorcinol diacetate when attempted to be melt polymerized in accordance with Example 1 does not yield a polymer which gradually increases to the desired molecular weight. Instead, the presence of the impurities changes the stoichiometry of the reaction thereby prohibiting a high molecular weight polymer formation. The resulting product is dark amber, brittle, glossy, and has a low molecular weight which is insufficient for use in typical injection molding techniques.

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A process for preparing a melt processable resorcinol phthalate polyester which comprises:
   (a) reacting resorcinol diacetate with a phthalic acid selected from the group consisting of isophthalic acid and a mixture of isophthalic and terephthalic acid wherein the terephthalic acid is present therein in an amount not greater than about 30 mole percent of said mixture, which reaction is conducted in the presence of a metal acetate catalyst wherein said metal is selected from the group consisting of cations of alkali and alkaline earth metals and mixtures thereof and at a temperature of about 180° to about 240° C. for a period sufficient to form a non-volatile pre-polymer; and
   (b) polymerizing the non-volatile pre-polymer of step (a) at a temperature above the melting point of both the prepolymer and the resulting polymerized product in the presence of a metal catalyst wherein said metal is selected from the group consisting of cations of alkali and alkaline earth metals and mixtures thereof to yield a polyester having an inherent viscosity of about 0.4 to about 1.5.

2. The process of claim 1 wherein the phthalic acid is a mixture of from about 90 to about 80 mole percent isophthalic acid and correspondingly from about 10 to about 20 mole percent terephthalic acid.

3. The process of claim 1 wherein the metal of said metal acetate catalyst is selected from the group consisting of Li, Na, K, Ca, and mixtures thereof.

4. The process of claim 1 wherein said metal acetate catalyst is a mixture of sodium acetate and potassium acetate wherein the components of said mixture are present at a molar ratio of about 1:1.

5. The process of claim 1 wherein said metal acetate catalyst is present during stages (a) and (b) at an amount of about 1.0 to about 0.1% by weight.

6. The process of claim 1 wherein the reaction which yields said non-volatile pre-polymer of step (a) is conducted at a temperature of about 200° to about 240° C.

7. The process of claim 1 wherein the melt polymerization of said non-volatile pre-polymer of step (b) is conducted at a temperature of about 260° to about 290° C.

8. The process of claim 1 wherein the inherent viscosity of said resorcinol phthalate polyester is about 0.5 to about 1.0.

9. The process of claim 1 wherein the reaction which yields said non-volatile pre-polymer of step (a) is conducted at a temperature of about 220° to about 240° C.

10. The process of claim 1 wherein the melt polymerization of said non-volatile pre-polymer of step (b) is conducted at a temperature of about 260° to about 290° C.

11. The process of claim 1 wherein the inherent viscosity of said polyester is about 0.5.

12. The process of claim 1 wherein the phthalic acid is a mixture of about 90 mole percent isophthalic acid and correspondingly about 10 mole percent terephthalic acid.

13. The process of claim 1 wherein the resorcinol diacetate is reacted with the phthalic acid in step (a) in the presence of a heat transfer medium which is removed from the non-volatile pre-polymer prior to commencing the polymerization reaction of step (b).

14. The process of claim 12 wherein the heat transfer medium is diphenyl ether which is present in an amount which can vary from about 10 to about 50% by weight of the combined weight of reactants and heat transfer medium.

15. A process for preparing a melt processable resorcinol phthalate polyester which comprises:
(a) reacting resorcinol and an acetylating agent by heating said compounds to a temperature of about 100° to about 130° C. and in a manner sufficient to yield resorcinol diacetate;
(b) purifying the resulting resorcinol diacetate to the extent sufficient to obtain at least 99.5% resorcinol diacetate;
(c) reacting the resulting purified resorcinol diacetate with a phthalic acid selected from the group consisting of isophthalic acid and a mixture of isophthalic and terephthalic acid whereing the terephthalic acid is present therein an amount not greater than about 30 mole percent of said mixture which reaction is conducted in the presence of a metal acetate catalyst wherein said metal is selected from the group consisting of cations of alkali and alkaline earth metals and mixtures thereof and at a temperature of about 180° to about 240° C. for a period sufficient to form a non-volatile prepolymer; and
(d) polymerizing a melt of the pre-polymer of step (c) at a temperature of about 240° to about 300° C. in the presence of a metal acetate catalyst selected from the group consisting of cations of alkali and alkaline earth metals and mixtures thereof to yield a polyester having an inherent viscosity of about 0.4 to about 1.5.

16. The process of claim 15 wherein the phthalic acid is a mixture of from about 90 to about 80 mole percent isophthalic acid and correspondingly from about 10 to about 20 mole percent terephthalic acid.

17. The process of claim 15 wherein the metal of said metal acetate catalyst is selected from the group consisting of Li, Na, K, Ca, and mixtures thereof.

18. The process of claim 15 wherein said metal acetate catalyst is a mixture of sodium acetate and potassium acetate wherein the components of said mixture are present at a molar ratio of about 1:1.

19. The process of claim 15 wherein said metal acetate catalyst is present during stages (a) and (b) at an amount of about 1.0 to about 0.1% by weight.

20. The process of claim 15 wherein the reaction which yields said non-volatile pre-polymer of step (a) is conducted at a temperature of about 200° to about 240° C.

21. The process of claim 15 wherein the melt polymerization of said non-volatile pre-polymer of step (d) is conducted at a temperature of about 260° to about 290° C.

22. The process of claim 15 wherein the inherent viscosity of said polyester is about 0.5 to about 1.0.

23. The process of claim 15 wheein the reaction which yields said non-volatile prepolymer of step (a) is conducted at a temperature of about 220° to about 240° C.

24. The process of claim 15 wherein the melt polymerization of said non-volatile prepolymer of step (a) is conducted at a temperature of about 270° to about 280° C.

25. The process of claim 15 wherein the inherent viscosity of said polyester is about 0.5.

26. The process of claim 15 wherein the phthalic acid is a mixture of about 90 mole percent isophthalic acid and correspondingly about 10 mole terephthalic acid.

27. The process of claim 15 wherein the resorcinol diacetate is reacted with the phthalic acid in step (c) in the presence of a heat transfer medium which is removed from the non-volatile pre-polymer prior to commencing the melt polymerization of step (d).

28. The process of claim 15 wherein the acetylating agent is selected from the group consisting of acetic anhydride and acetyl halides.

29. The process of claim 15 wherein the resorcinol diacetate is purified by vacuum distillation.

30. A process for preparing a melt processable resorcinol phthalate polyester which comprises:
(a) reacting resorcinol and acetic anhydride by heating said compounds to a temperature of about 100° to about 130° C. to form resorcinol diacetate;
(b) purifying the resulting resorcinol diacetate by vacuum distillation to obtain at least 99.5% resorcinol diacetate;
(c) reacting resorcinol diacetate with a mixture of isophthalic acid and terephthalic acid wherein the isophthalic acid is present in said mixture in an amount of about 90 mole percent and terephthalic acid is present therein in an amount of about 10 mole percent of said mixture which reaction is conducted in the presence of from about 1.0 to about 0.1% by weight of a metal acetate catalyst comprising a mixture of sodium acetate and potassium acetate wherein the components of said catalyst mixture are present at a molar ratio of about 1:1 and at a temperature of about 220° to about 240° C. for a period sufficient to form a non-volatile pre-polymer;

(d) polymerizing a melt of the pre-polymer of step (c) at a temperature of about 240° to about 280° C. in the presence of from about 1.0 to about 0.1% by weight said metal catalyst mixture of step (c) to yield a polyester having an inherent viscosity of about 0.5 to about 1.0.

31. A process for preparing a melt processable resorcinol phthalate polyester which comprises:
(a) reacting resorcinol diacetate with a mixture of isophthalic acid and terephthalic acid wherein the isophthalic acid is present in said mixture in an amount of about 90 mole percent and terephthalic acid is present therein in an amount of about 10 mole percent of said mixture which reaction is conducted in the presence of from about 1.0 to about 0.1% by weight of a metal acetate catalyst comprising a mixture of sodium acetate and potassium acetate wherein the components of said catalyst mixture are present at a molar ratio of about 1:1 and at a temperature of about 220° to about 240° C. for a period sufficient to form a non-volatile pre-polymer; and
(b) polymerizing a melt of the pre-polymer of step (a) at a temperature of about 240° to about 280° C. in the presence of from about 1.0 to about 0.1% by weight said metal catalyst mixture of step (a) to yield a polyester having an inherent viscosity of about 0.5 to about 1.0.

32. A melt processable resorcinol phthalate polyester which comprises the reaction product of resorcinol diacetate and a mixture of about 95 to about 80 mole percent isophthalic acid and correspondingly from about 5 to about 20 mole percent by weight terephthalic acid.

33. The melt processable resorcinol phthalate polyester of claim 30 wherein said mixture comprises from about 90 mole percent isophthalic acid and correspondingly about 10 mole percent terephthalic acid.

* * * * *